July 6, 1971  N. E. AUBREY ET AL  3,591,409
PROCESS FOR COATING RESIN GRANULES BY HIGH INTENSITY
MECHANICAL BLENDING AND PRODUCT OBTAINED THEREBY
Filed July 28, 1969

INVENTORS
NORMAN E. AUBREY
ROBERT E. BEAULIEU
WILLIAM J. HALL
BY John W. Klooster
ATTORNEY 3,591,409
PROCESS FOR COATING RESIN GRANULES BY HIGH INTENSITY MECHANICAL BLENDING AND PRODUCT OBTAINED THEREBY
Norman E. Aubrey, South Hadley, Robert E. Beaulieu, Monson, and William J. Hall, Brimfield, Mass., assignors to Monsanto Company, St. Louis, Mo.
Continuation-in-part of application Ser. No. 624,733, Mar. 21, 1967. This application July 28, 1969, Ser. No. 845,384
Int. Cl. B44d 1/12; B32b 5/30
U.S. Cl. 117—100C
5 Claims

ABSTRACT OF THE DISCLOSURE

A method for preparing coated resin granules wherein a mixture of resin ganules, a wax and a particulate material is subjected to high-intensity blending at elevated temperatures and the product produced thereby. The product thermoplastic resin composition is characteristically dry and substantially dust-free. The wax with the particulate solid material embedded therein substantially uniformly distributed over the surfaces of individual resin particles.

CROSS-REFERENCE TO RELATED APPLICATION

This application is a continuation-in-part of our copending application Ser. No. 624,733, filed Mar. 21, 1967 and now abandoned.

BACKGROUND

In compounding various resins especially thermoplastic resin granules, it is often necessary to incorporate various solid additives, such as pigments, blowing agents and the like. In some instances, the resin manufacturer incorporates such additives into the resin during its manufacture so that a customer buys and stocks various classes of resin granules already formulated to meet his needs. However, in other instances, the compounding of preformed resin with solid additives is effected by the customer or the user at the time that the resin is to be used. When a resin manufacturer incorporates the solid additives into resin granules or pellets, there is inconvenience to both the manufacturer and the customer in that each must normally maintain fairly large inventories of resins or polymers containing particular solid additives or else individual resin compositions must be custom made to order before use.

The method most generally employed for incorporation of dry additives into polymers is to blend the respective classes of components together in an extruder, Banbury or other smilar apparatus during which the polymer is partially or fully fluidized under heat and pressure so as to entrain therewith the particulate solids. Such techniques oftentimes produce non-uniform products in that the particulate solid material or the resin itself may agglomerate and minimize the uniformity of dispersion. In addition, extrusion blending techniques require appreciable downtime for cleaning of the equipment when the composition of the resin or the finely divided dry additive is being changed, since the extruder and all the auxiliary equipment and connecting conduits through which the mixing stream passes must normally be cleaned before a different composition can be prepared. In general, extrusion blending or Banbury compounding tends to be relatively expensive and to require production of relatively large quantities of resin compositions for purposes of inventory to meet a customer's or user's needs upon short notice.

If a given composition of resin and particulate additive is prepared by simple mechanical mixing techniques, there is a tendency not only to lose the powdered additive during mixing but also afterwards through settling. When one adds a binder to such a mixture of resin and powdered additive, the additive tends to collect in the binder, and the binder tends to be non-uniformly distributed throughout the product blend and to be concentrated in little nodules dispersed over resin particle surfaces.

With the objects of overcoming such shortcomings in prior art resin formulating technology; of making possible the ability to formulate on short notice, rapidly and efficiently, quantities of resin with particulate additive uniformly dispersed therethrough; of making dry, uniform, stable, substantially dust-free compositions of resins and particulate additives; and of making new and useful particulate additive blends which are suitable for use, among other things, as concentrates for blending with other resin systems; there has now been developed a new and very useful blending process and product produced therefrom which utilizes particulate resin, particulate additive, wax, and high intensity mixing equipment and conditions.

SUMMARY OF THE INVENTION

It has now been found that the foregoing and related objects and advantages may be readily attained by using a method which comprises subjecting a mixture of the discrete thermoplastic resin particles, a hydrocarbon wax and a paticulate solid material to high-intensity blending at elevated temperatures. The wax has a melting point above ambient temperature and below about 120° C. and is used in an amount sufficient to cover substantially the entire surface of the substrate. High intensity blending is produced by mechanically introducing into the mixture a quantity of energy ranging from 0.05 to 0.40 horsepower per pound of mixture and by creating therein a shear rate of at least 800 seconds$^{-1}$, and is continued for a period of time sufficient to heat the resin, melt the wax, and coat the particles with a mixture of wax and finely divided solid material.

Upon cooling of the mixture, a particulate product is obtained which has the finely divided solid material firmly and unifomly adhered to the surface of the particles. The coated resin may then be molded or extruded to form sheets or other structures which have excellent surface characteristics and other physical properties.

Thus, the instant process requires high-intensity blending in combination with the utilization of a wax, a thermoplastic resin, and a particulate solid material. The high-intensity blending serves not only to break down and/or prevent the formation of agglomerates and to uniformly distribute the wax and the finely divided solid material, but also optionally to provide heat to the mixture. Supplemental heat may be added to a mixture being blended if desired without departing from the spirit of this invention. The wax provides a bonding medium which serves to maintain the finely divided solid material uniformly distributed upon the particulate resin and to prevent undue dustiness in the product. A process is thereby provided wherein uniformly coated particles may readily be produced under conditions of heat and agitation which are in no way detrimental to the properties of the products.

The product produced by the foregoing process is a substantially dust-free, dry, uniform, stable thermoplastic resin composition comprising a plurality of discrete thermoplastic resin granules which are individually substantially uniformly coated with hydrocarbon wax, the average thickness of the wax coating ranging from about 0.5 to 15 microns. The wax has substantially uniformly distributed therethrough solid particluate material.

THE HIGH-INTENSITY BLENDER

To achieve the required increases in temperature and high levels of homogeneity, an input of energy ranging from about 0.05 to 0.4 horsepower per pound of material is necessary. In addition to such an energy input, it is essential that the high-intensity blending create a shear rate in the material of at least about 800 seconds$^{-1}$, and generally no more than 25,000 seconds$^{-1}$. Under such conditions, temperature increases in the material ranging from about 45 to 140° C. are employed. The exact temperature increase in any given situation is dependent upon the heat capacity and other physical characteristics of the resin, as well as the capacity of the apparatus for extracting heat from the material.

The speed of agitators within the blender necessary to produce such conditions will, of course, vary with the design of the blender. When agitation is achieved by rotating blades, speeds within the range of 1500 to 4000 r.p.m. are typical. A type of apparatus which has been advantageously employed is a high-shear mixer manufactured under the designation Prodex-Henschel Mixer by the Prodex Division of the Koehring Company, Fords, N.J.

THE RESIN

Although it is particularly advantageous to practice this invention with those thermoplastic resins or polymer which are most sensitive to elevated temperatures because, although the process is rapid and temperatures involved are relatively low, nevertheless, the particulate resin substrate must be relatively non-friable and have a melting point sufficiently high such that it will not melt or soften under the conditions of blending and thus tend to agglomerate and foul the apparatus. Generally, the resin used has a melting temperature at least 20° C. above the melting temperature of the wax, and, of course, preferably above the temperature generated during the blending.

Exemplary of the thermoplastic resins which may be employed are the polyolefins, such as polyethylene, polypropylene and olefin copolymers; vinylidene polymers, such as polystyrene, polyvinyl chloride, polyvinylidene chloride, ABS (acrylonitrile/butadiene/styrene graft copolymer) type resins, and other copolymers of such vinylidene compounds; the polyamides; the polycarbonates; the polyfluorocarbons; the cellulose esters; the acetals, etc. In general, any thermoplastic resin having physical characteristics as indicated herein is suitable for use in this invention.

The thermoplastic resin used is in the physical form of particles or granules generally falling in the size range of from about 0.01 to 0.15 inch. In general, the particle size of a given substrate resin is not critical so long as it is sufficiently small that agitation under conditions of high-intensity blending is feasible, and is sufficiently large that finely divided coating materials may practically be bonded thereto for use as starting materials. Extruded pellets having a particle size in the range of from about 0.03 to 0.15 inch, and beads, having a particle size within the range of from about 0.01 to 0.05 inch are, for example, suitable.

THE WAX

Since the wax must necessarily melt in order to be effective in the present application, the initial form thereof is relatively unimportant, although the wax should be employed in a form which would tend to facilitate the melting thereof, such as relatively small particles. In addition, the wax should preferably be added to the blender in the solid state since it has been found that melting of the wax prior to addition may result in non-uniform coatings upon the polymer particles and may tend to promote agglomeration.

The melting point of the wax employed should be above ambient temperature (i.e. about 35° C.), but below about 120° C. The melting point preferably should be sufficiently low so that the wax will melt at temperatures which are readily attainable by means of high-intensity blending and at which the substrate being coated is not adversely affected. On the other hand, it is necessary that the melting point be sufficiently high (i.e. above ambient) that the wax has no significant tendency to melt under ordinary conditions of storage, handling, and occasional drying of the pellets prior to extrusion when necessary, after completion of the coating procedure, and thereby cause agglomeration of the particles and non-uniformity in the coatings.

The wax used should preferably have a substantially completely crystalline structure below its melting temperature, should preferably be nonvolatile at the temperatures involved in the process, and should preferably have no tendency to react with the substrate or the particulate solid material, so as to form new compounds or deleteriously affect the properties of the product ultimately obtained.

In general, the natural hydrocarbon waxes employed are insoluble in water, partly soluble in alcohol, ether, etc. and usually are miscible with oils and fats. Naturally occurring hydrocarbon waxes are typically esters, and in addition may contain free fatty acids, free alcohols, and higher hydrocarbons. Natural waxes are distinguished from fats (which are esters of glycerol) as consisting chiefly of esters of higher monohydroxy alcohols. In general, waxes are less greasy, more brittle and harder than fats.

Exemplary of the hydrocarbon waxes which are suitable for use in accordance with this invention when substantially completely crystalline below their melting points are the animal waxes, such as beeswax, Chinese wax, and spermaceti; vegetable waxes, such as carnuba, Japan and candelilla; mineral waxes, such as ozocerite, ceresin, montan wax; and the petroleum waxes, such as paraffin, and forms of crystalline petrolatum. In addition, numerous of the synthetic waxes can also be employed to great advantage, such as the amine, amide and ester derivatives of fatty acids, the phthalates, the low to medium molecular weight polymers, for example, terphenyl hydrocarbons, polyethylene, the polyalkylene glycols (preferred), the chloronaphthalenes, etc. Mixtures may be used. A hydrocarbon plasticizer having waxy properties as characterized above may be employed.

The amount of wax employed will depend upon the amount of polymer which is involved and the quantity of the finely divided solid material which it is desired to bond thereto, but for the best results, it is necessary that the amount of wax employed be sufficient to entirely coat the surface of the particulate resin. The optimum quantity will also depend somewhat upon the viscosity of the wax at the temperatures involved; i.e. less of a low viscosity wax will be necessary. Generally, an amount of wax in a product composition ranges between about 0.1 and 2.0 percent, based on 100 parts by weight of resin granules is utilized, with the preferred range being between about 0.6 and 1.0 percent. If too much wax is employed, molded articles prepared from a product composition tend to be mottled, mixing efficiency is reduced, and agglomeration and hang-up on the walls of a blender tend to be encountered. If too little wax is employed, the result is a dusty product wherein the particulate solid material is incompetely bonded to wax and resin.

THE PARTICULATE SOLID MATERIAL

Various particulate solid materials may be utilized in accordance with the present invention, including pigments, foaming, or blowing agents, antistatic agents, antifoaming agents, surfactants, and the like. Although the ideal materials are added initially in finely divided form, it will be appreciated that the high-intensity blending operation will tend to disintegrate or particulate larger particles of friable material or agglomerates thereof into the desired finely divided form to be incorporated in the coating. In general, such a material should have an average particle size of under about 20 microns, and a melting point at least equal to the melting point of the particular thermoplastic resin granules employed.

The present invention has proven to be particularly advantageous from the standpoint of addition of pigments to thermoplastic resins. By reason of the high degree of uniformity in dispersion, the molded products made from the coated resins produced by the process of the present invention have been found to exhibit very good color development, uniformity of color and surface characteristics without undue effect upon other physical properties.

The amount of particulate solid material in a product composition generally ranges from above about 0 to about 10 weight percent, and preferably about 1 to 5 weight percent, based on 100 parts by weight of resin granules. Resin granule surface area influences the total amount of particulate solid material used in a given product composition. Higher levels of incorporation have generally been found to be impractical due to the problems encountered in using the higher amount of wax necessary to retain such quantities, and due to the limitations of mixing inherent even with the indicated high-intensity blending conditions used.

PROCEDURE

Although the wax and the particulate resin may be added to the blender simultaneously, in the preferred method the first step is to place the particulate substraute into the high-intensity blender and subject the particles to conditions of high-intensity blending for a period of time sufficient to raise the temperature thereof to one at which the wax employed will melt. Generally, this will be accomplished in a period of less than about five minutes, shorter periods, if possible, usualy being more desirable. It should be noted at this point that it is desirable to raise the temperature of the substrate to as high a level as possible, consistent with proper treatment thereof. The temperature achieved should, however, be optimized with the time necessary to achieve it, since unduly long process cycles are uneconomical and tend to be deleterious.

After the desired temperature is achieved, the wax is added in solid form, and the combination of wax and substrate is subjected to additional high intensity blending for a period of time sufficient to ensure that the wax is entirely melted and uniformly coated upon the resin particles. During this time, there will normally be a further rise in temperature, and this should be borne in mind when determining the initial temperature to which the substrate will be brought before addition of the wax. The time required to ensure that the wax is uniformly coated upon the particulate material is generally less than five additional minutes, depending, of course, upon the temperature to which the substrate material is preheated prior to introduction of the wax, the melting point of the wax and other factors which will be apparent.

After coating the particulate substrate with the wax, the finely divided solid coating material is introduced into the blending apparatus. The entire mixture is then subjected to high-intensity blending for a period of time sufficient to entirely disperse the solid coating material. This step normaly requires less than ten minutes' time.

After thoroughly dispersing the finely divided coating material, the sample is removed from the blending apparatus. The mixture is thereafter allowed to cool, whereupon the wax solidifies and firmly bonds the finely divided coating material to the surface of the particulate resin. A typical period necessary for the cooling step is about ten minutes, but this will depend upon the initial temperature, the mass involved and the cooling vessel; however, cooling may also be effected in the blending apparatus itself if so desired.

It should be appreciated that the times required for the foregoing steps are approximate and in some cases may be longer than indicated. In most cases, however, it will be found that the indicated times are more than sufficient and that the time requirements can be reduced significantly. The overall time necessary to carry out the high-intensity blending process is usually not in excess of thirty minutes, and in some cases can be for as short a duration as five minutes. The temperatures involved will depend upon the characteristics of the particulate resin, the wax, and the high-intensity blender. Normally, all ingredients will be introduced into the blender at ambient temperature; the highest temperatures achieved in the mixture will generally range between about 40 and 175° C. and preferably between 60 and 105° C.

It will be appreciated that the process of the present invention can be described batch-wise or continuously.

DESCRIPTION OF THE DRAWINGS

Turning to the drawings, there is seen:

In FIGS. 1 and 2, there is depicted an embodiment of the present invention. Here, a resin granule 12 is substantially uniformly coated with a hydrocarbon wax 11. The wax has substantially uniformly distributed therethrough solid particulate material 10.

In FIG. 3, there is depicted a prior art coated resin granule. Here, a resin granule 17 is discontinuously and irregularly coated with a wax 16, and a solid particulate material 15 is distributed generally over surfaces of wax 15 and granule 17 with only a small portion thereof being bonded to the composite of wax and resin, and even this small bonded portion is largely on or near the surface of the wax with little or no material being in the wax interior. The prior art product is thus largely inferior to the present product for reasons and uses above and below indicated.

DESCRIPTION OF THE PREFERRED EMBODIMENTS

Figure 1:
FIG. 1, wherein is shown an artist's diagrammatic representation of a side elevational view of a single coated resin particle prepared in accordance with the teachings of the present invention.
Figure 2:
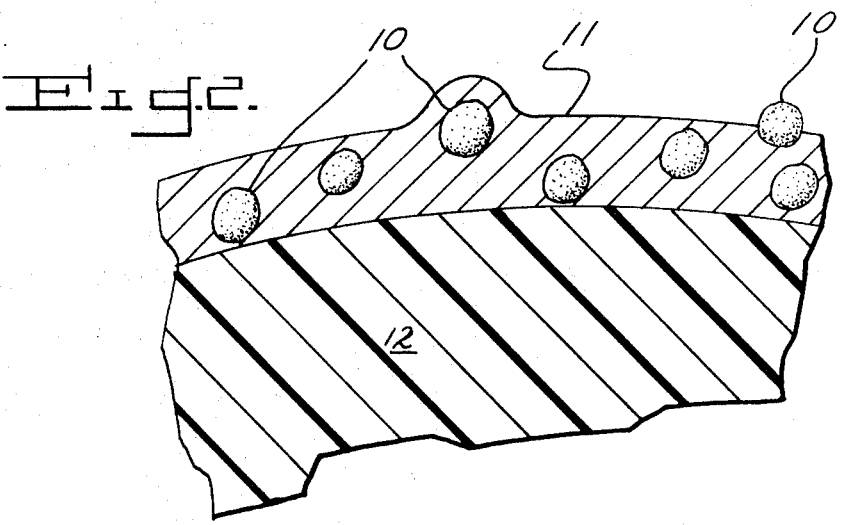
FIG. 2, wherein is shown a vertical sectional view taken through the resin particle of FIG. 1, some parts thereof broken away.
Figure 3:
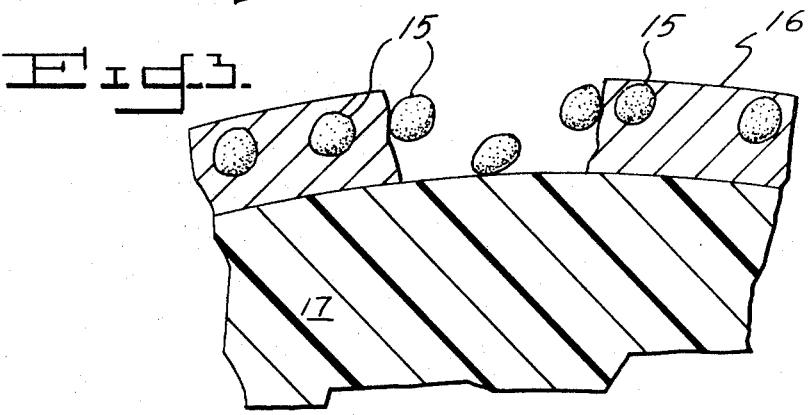
FIG. 3, wherein is shown a view similar to FIG. 2 but showing a coated resin particle prepared in accordance with the teachings of the prior art.

Illustrative of the efficacy of the present invention are the following specific examples wherein all parts and percentages are by weight unless otherwise specified.

EXAMPLE ONE

A series of specimens is prepared utilizing various techniques to color a particulate plastic with a finely divided solid pigment. In each case, the plastic is an ABS polymer in the form of pellets having an average particle size range of from about .07 to 0.10 inch and a melting point of about 100° C. Beads are also found to be similarly suitable. A difficult to disperse speckling pink formulation is employed as a particulate solid pigment to present a rigorous test of the effectiveness of the various coloring techniques. The speckling pink formulation is a mixture of pigment and titanium dioxide in a ratio of 4:100. The pigment particles have a melting point well above 300° C. and have particle sizes under 20 microns. Unless otherwise indicated, the wax employed is a polyethylene glycol having a molecular weight of about 20,000 (PEG 20,000) which has a melting point of about 50–55° C. and is substantially completely crystalline below this melting point.

In the cases wherein high intensity blending is employed, the apparatus used is a commercially available Prodex-Henschel Model 2–JSS high-intensity blender. This equipment is available from Prodex Division, Koehring Company, Fords, N.J. The remaining cases utilized an ordinary drum tumbler (48 r.p.m. maximum) or blending in an extruder.

After specimens are prepared, the level of color adherence of each is measured by the following procedure: A weighed sample comprising about 100 parts of the dry colored specimen is placed upon a 40 mesh screen which in turn is placed between two 20 mesh screens. Air at 60 pounds gauge pressure is directed upon the pellets from a position about 1½ inches above them until there is no further evidence of dust being blown off (about two to three minutes). The sample is thereafter reweighed to calculate the percentage of the initial color loading which is blown off.

Portions of each specimen are also molded to form 3 x 4 inch chips, which are visually inspected for color development, surface characteristics, uniformity of dispersion of pigment, etc. Spectrophotometric color curves are also developed using a General Electric Recording Spectrophotometer, to demonstrate coloring efficiency.

SPECIMEN A

About 5 lbs. ABS resin is loaded into a high-intensity blender at ambient temperature. This sample is subjected to high-intensity blending at 3800 r.p.m. for about five minutes to raise the temperature thereof to 55 to 60° C. At this point, 0.75 percent of polyethylene glycol wax, based upon the weight of the resin, is introduced, the mixture being subjected to high-intensity blending for an additional period of about five minutes to completely melt the wax, during which time the temperature rises to about 64° C. A quantity of pigment comprising 3.12 percent, based upon the weight of resin, is next added to the blender and uniformly distributed by the high intensity action thereof. After a period of about ten minutes, the product having a temperature between 70 and 75° C. is removed from the blender and the wax is allowed to solidify. The specimen so produced is employed in the above-described tests.

SPECIMEN B

The technique described with regard to Specimen A is substantially repeated with the sole exception that 4.16 percent of pigment is employed to produce the specimen. The color is added when the temperature of the mixture is 68° C.

SPECIMEN C

Once again, the technique employed to produce Specimen A is repeated employing 5.20 percent of pigment to produce the specimen. The color is introduced into the blender when the temperature of the mixture is about 72° C.

SPECIMEN D

The technique employed for Specimen A is once again repeated employing 6.24 percent of pigment in the blend. The pigment is added when the temperature of the mixture is 76° C.

SPECIMEN E

To produce this specimen, the technique employed to produce Specimen A is repeated with the sole exception that 1.0 percent of Acrawax C (trademark for a synthetic wax melting at 140–143° C. sold by Glyco Chemicals, Inc.) is substituted for the 0.75 percent of polyethylene glycol. This wax did not melt under the conditions of operation.

SPECIMEN F

To produce this specimen, 0.75 percent, based upon the weight of the resin, of Santicizer 1–H (trademark for Monsanto Company's N-cyclohexyl-p-toluenesulfonamide, which melts at 85° C.) is substituted for the polyethylene glycol employed for Specimen A.

SPECIMEN G

A quantity of ABS resin charged into an extruder with 3.12 percent by weight thereof of pigment; no wax (and no high intensity blending) is employed in the production of this specimen.

SPECIMEN H

Specimen H is produced by utilizing 3.12 percent of pigment based upon the weight of resin; no wax is utilized. The resin and pigment are drum tumbled to blend them.

SPECIMEN I

To produce this specimen, a drum-type tumbler is again employed. However, in this instance 1.5 percent of polyethylene glycol wax is used to coat the particulate resin. The wax is heated to melt it prior to introduction into the drum tumbler to ensure that it would be a liquid capable of coating the particles.

SPECIMEN J

The technique of Specimen I is substantially repeated with the sole modification that 3.0 percent of polyethylene glycol is employed rather than the 1.5 percent of the wax used therein.

Table One which follows presents data obtained using the foregoing specimens A–J.

TABLE ONE

| Specimen | Blender [1] | Percent Wax | Color introduced | Color blown off [2] | Reflectance at 540 mμ [3] |
|---|---|---|---|---|---|
| A | High intensity | 0.75 | 3.12 | 1.2 | 27.0 |
| B | do | 0.75 | 4.16 | 2.0 | 35.5 |
| C | do | 0.75 | 5.20 | 1.9 | 35.0 |
| D | do | 0.75 | 6.24 | 20.8 | 34.5 |
| E | do | 1.0 | 3.12 | [4] 70.0 | 27.5 |
| F | do | 0.75 | 3.12 | 0 | 27.0 |
| G | Extruder | 0 | 3.12 | [5] 0 | 36.5 |
| H | Drum tumbler | 0 | 3.12 | 94.0 | 32.5 |
| I | do | 1.5 | 3.12 | 9.6 | 35.5 |
| J | do | 3.0 | 3.12 | 9.6 | 36.5 |

[1] The preparation of each specimen of a product of this invention involved the use of about 0.06 horsepower per pound of material with an accompanying shear rate of about 1,250 seconds -1.
[2] This value can be considered to be a dustiness index.
[3] Plaques of product are molded prior to subjecting sample to the percent color blown off test described in the preceding column. Measurements in this column are independent of the percent color blown off. For speckling pink, the color efficiency is indicated by the percent of yellow absorbed in the 500–560 mμ region. The more yellow absorbed (the less yellow reflected) indicates the higher efficiency of pink color development.
[4] Combined color and wax.
[5] Color incorporated within polymer.

With reference to Table One, the molded chip produced from Specimen A exhibited a well developed color and a very glossy surface. The pellets are substantially dust-free and substantially no color can be rubbed off by hand manipulation. The molded chip produced from Specimen B has a somewhat lighter color than that produced from Specimen A. Its surface is good and the pellets are essentially free of dust. It is possible to rub a slight amount of the color off of the pellets produced as Specimen C. The corresponding molded chip is slightly mottled, but its surface is good. The Specimen D pellets are very dusty. The corresponding chip is badly mottled although its surface is quite good.

With regard to the specimen designated E, the pellets are very dusty, much of the wax and color being blown off. The molded chip produced, however, has good color and surface characteristics. The Specimen F pellets are essentially free of dust. However, extreme caking and agglomeration occurred in the blender and the molded chip is very badly mottled.

The pellets produced under Specimen G are substantially free of dust. The corresponding molded chip exhibited a very light color; its surface is excellent. Extremely dusty pellets resulted from the procedure used to produce Specimen H. Although the surface of the corresponding molded chip produced is good, the color is poorly developed. The Specimen I pellets are somewhat dusty. In the corresponding molded chip, the color is good but lighter than that of Specimen A; the surface of the chip is good but also less glossy than that of Specimen A. The pellets produced under Specimen J are somewhat dusty. In the corresponding chip, the color and surface are respectively lighter and less glossy than the Specimen A chip.

It is apparent from the foregoing data that the combination of high intensity blending with the utilization of a wax melted therein not only yields plastic particles which are essentially dust-free and molded parts which exhibit good coloration and surface appearance, but also provides a process which is convenient and economical. It is seen that optimum results are achieved when 0.75 percent of the wax and 3.12 percent of color, both based upon the weight of resin, are employed. Under the conditions of operation, 5.2 percent of color was found to be a practical upper limit. Increasing the weight of wax allows the use of more pigment, but has a tendency to cause agglomeration and inefficient blending.

Utilization of high-intensity blending without a wax tends to produce a very dusty product. This is indicated by Specimen E wherein a wax having a high melting temperature was employed, which would be comparable to utilizing no wax, since it would not melt to a significant degree under the operating conditions. Employing a wax that melts, but a relatively high temperature, such as in Specimen F, results in a product which is dust-free but causes agglomeration and a high level of mottling in molded chips.

Although an extruded specimen is essentially free of dust, because the finely divided solid material is incorporated within the plastic, the color of the molded chip is very light and the percent reflectance at 540 m$\mu$ is high, both indicating poor efficiency of coloration. Employing a low-intensity blender, such as a drum tumbler, without a wax results in an extremely dusty product which produces molded chips exhibiting poor color development. The same technique with a premelted wax produces a dusty product. As evidenced by the percent reflectance at 540 m$\mu$, the efficiency of coloration in specimens produced by such a method is quite poor.

EXAMPLE TWO

Samples are prepared from ABS resin used in Example One using the dry coloring technique described under Specimen A above, and the extrusion technique described under Specimen G. In the dry coloring technique, 0.75 percent of polyethylene glycol with a molecular weight of 20,000 based upon the resin, is employed. Three samples are prepared, using different pigments, with each technique.

From the colored resins produced, ½ x ¼ inch impact bars were injection molded and tested for Izod impact strength. Table Two which follows presents the data obtained, which indicate that the dry coloring technique has no substantial adverse effect upon the strength of the molded product.

TABLE TWO

|  | Weight of pigment, percent by weight of resin | Dry colored sample, ft. lbs./in. of notch | Extruded control, ft. lbs./in. of notch |
|---|---|---|---|
| Black | 0.1 | 2.90 | 2.78 |
| Blue | 2.75 | 2.82 | 2.82 |
| White | 4.6 | 2.51 | 2.59 |

Thus, it can be seen that the process of the present invention is advantageously employed to produce a coated particulate resin quickly and efficiently with the expenditure of a minimum of man hours and equipment costs. The products produced by the teachings of this invention can have realtively large quantities of finely divided material associated with them and yet be relatively dust free. Molded products produced from coated thermoplastics have good physical properties; they have the finely divided solid material uniformly dispersed therein and are essentially free of agglomerates. It is seen that the method is well suited to the production of products which are readily tailored to a customer's needs upon short notice and without maintaining large inventories of modified polymers and with a minimum of down time for the cleaning of processing equipment. Moreover, concentrates of the solid additive in a resin may be prepared for blending with unmodified resin to minimize the amount of resin to be processed.

EXAMPLES THREE THROUGH SEVENTEEN

Using the apparatus described in Example 1, a series of specimens are prepared using processing conditions of about 3500 seconds$^{-1}$ and 0.2 horsepower per pound of material (except for Example 14 where the processing conditions were about 1200 seconds$^{-1}$ and about 0.06 horsepower per pound). These conditions were applied for a time sufficient to raise the temperature of the material being blended to approximately 5–10° C. above the melting point of the wax used in each instance. The starting materials and the product specimens are summarized in Table Three below. In each instance, a substantially dust-free, dry, uniform, stable thermoplastic resin composition is obtained.

TABLE THREE

| Example No. | Resin particles | | | Hydrocarbon wax | | | Particulate solid material | | | |
|---|---|---|---|---|---|---|---|---|---|---|
| | Chemical structure | Melting temp.[1] | Average particle size, in. | Chemical structure | Melting temp., °C. | Parts by weight (based on 100 parts resin weight) | Chemical structure | Particle size, microns | Melting temp.[2] | Parts by weight (based on 100 parts resin weight) |
| 1 | Polyvinyl chloride homopolymer[3] | 68° C. (softening)[4] | *0.125 | Polyethylene glycol[5] | ca. 30 | 0.5 | Pigment[6] | <1 | >100 | .025 |
| 2 | Homopolystyrene | 90° C. (softening) | .10 | Synthetic beeswax | ca. 63 | 0.2 | UV stabilizer[7] | <20 | >100 | .25 |
| 3 | do | do | .10 | do | ca. 63 | 1 | Pigment[8] | <5 | >300 | .2 |
| 4 | Impact modified polystyrene[9] | 80° C. (softening) | .10 | Synthetic wax[10] | ca. 57–61 | 1.5 | do[11] | <20 | >350 | .7 |
| 5 | do[9] | do | .10 | Polyethylene glycol[5] | 50–55 | .3 | Blowing agent[12] | <20 | ca. 150–230 | .5 |
| 6 | Styrene/AN copolymer[13] | 100° C. (softening) | .10 | do[5] | 50–55 | .1 | Pigment[11] | <20 | >350 | .7 |
| 7 | do[13] | do | .10 | do[5] | 50–55 | .1 | Lubricant stabilizer[14] | <20 | ca. 130 | .3 |
| 8 | do[13] | do | .10 | do[5] | 50–55 | .1 | UV stabilizer[7] | <20 | >100 | .4 |
| 9 | do[13] | do | .10 | do[5] | 50–55 | .5 | Pigment[8] | <5 | >300 | .2 |
| 10 | Polyamide[15] | 300° C. (deflect) | .10 | do[5] | 50–55 | .5 | Pigment[8] | <1 | >300 | .025 |
| 11 | do[15] | do | .08 | do[5] | 50–55 | .3 | Nucleating agent[16] | <20 | >300 | 2.3 |
| 12 | Low density polyethylene[17] | 100–175° C. (deflect) | .08 | do[5] | 50–55 | .3 | Stabilizer and blowing agent[12] | <20 | 130 | 5.0 |
| 13 | do[17] | do | .15 | do[5] | 50–55 | .75 | Pigment[11] | <20 | >350 | 5.0 |
| 14 | Polymethyl methacrylate[18] | 200° C. (deflect) | .08 | do[5] | 50–55 | .75 | do[11] | >20 | >350 | .3 |
| 15 | Polysulfone[19] | 345° C. (deflect) | .08 | do[5] | 50–55 | 1.5 | Antistatic agent[21] | >20 | >150 | 5.0 |
| 16 | Homopolystyrene | 90° C. (softening) | .10 | do[20] | ca. 30 | 0.5 | Pigment[8] | >5 | >300 | .3 |
| 17 | ABS[22] | do | .09 | Beeswax | ca. 70 | 0.6 | do[11] | >20 | >350 | .5 |
| 18 | ABS[22] | do | .09 | Synthetic wax[23] | ca. 70 | 0.6 | Pigment[8] | >20 | >300 | .5 |
| 19 | Polysulfone[19] | 345° C. (deflect) | .08 | do[24] | ca. 150 | 1.5 | do[11] | >20 | >350 | .5 |

[1] The term "melting temperature" as used throughout this specification and claims in reference to resin particles is not true melting temperature but rather heat softening temperature, generally. Specific values and methods of measurement are specifically indicated where appropriate.
[2] The term "melting temperature" as used throughout this specification and claims in reference to particulate solid material is inclusive of decomposition temperature, subliming temperature or other temperature where such material undergoes a change of state.
[3] This polyvinyl chloride homopolymer is a compounded material available commercially under the trade designation Vyram 2810 natural from Monsanto Company, St. Louis, Mo.
[4] The heat distortion temperature measured using ASTM Test Procedure D-648.
[5] This polyethylene glycol is available commercially under the trade designation Carbowax 20,000 from Union Carbide Corporation.
[6] An ultra-marine pigment.
[7] 2(2'-hydroxy-5'-methyl-phenyl)-benzotriazole available commercially under the trade designation Tinuvin P from Geigy Chemical Company.
[8] Carbon black.
[9] A graft copolymer of styrene superstrate on a polybutadiene substrate available commercially under the trade designation HT-92 from Monsanto Company, St. Louis, Mo.
[10] A synthetic wax available commercially under the trade designation Glycowax S-932 from Glyco Chemicals Division of Chas. L. Huisking & Co., New York.
[11] Pink pigment as used in Example One, above.
[12] Azo-dicarbonamide as the blowing agent (1.13 parts by weight) and zinc stearate as the stabilizer (1.0 parts by weight).
[13] A copolymer of styrene and acrylonitrile available commercially under the trade designation LNA-21 from Monsanto Company, St. Louis, Mo.
[14] Zinc stearate.
[15] A polyamide resin available commercially under the trade designation Zytel-109 from E. I. du Pont de Nemours & Co., Wilmington, Del.
[16] This nucleating agent promotes a faster set up during molding and is a silica gel which is available commercially under the trade designation Cab-O-Sil 5 from Cabot, Inc.
[17] This low density polyethylene is available commercially from Monsanto Company, St. Louis, Mo.
[18] This rubber modified polymethylmethacrylate is available commercially from Rohm and Haas under the trade designation Plexiglass VS-100.
[19] This polysulfone is available commercially under the trade designation Bakelite P-3500 from Union Carbide Corporation.
[20] This polyethylene glycol is available commercially under the trade designation Carbowax 1500 from Union Carbide Corporation.
[21] This antistatic agent is a low molecular weight polymeric quaternary amine salt available commercially under the trade designation "Catanac LS" from American Cyanamid.
[22] A graft copolymer of styrene and acrylonitrile superstrate on a polybutadiene substrate available commercially from Monsanto Company under the trade designation Lustran ABS 420.
[23] A synthetic wax comprising synthetic terphenyl hydrocarbons available commercially under the trade designation Santowax from Monsanto Company.
[24] A synthetic wax comprising a wax-like amide derived from fatty acids under the trade designation Armid from Armour and Company, Chicago, Ill.
*Cubes.

What is claimed is:
1. A substantially dust-free, dry, uniform, stable thermoplastic resin composition produced by subjecting a mixture of particulate thermoplastic resin, hydrocarbon wax, and particulate solid material to high-intensity blending at elevated temperatures sufficient to melt said wax but insufficient to soften said particulate thermoplastic resin while simultaneously subjecting said mixture to high intensity mechanical blending using from about 0.05 to 0.40 horsepower per pound of said mixture with an accompanying shear-rate which is at least about 800 seconds$^{-1}$ but below that at which more than a minor weight percentage of the thermoplastic resin particles are broken into smaller bodies, said composition comprising:
   (A) a plurality of discrete thermoplastic resin particles characterized by having an average particle size range of from about 0.01 to 0.15 inch,
   (B) said resin particles being individually substantially uniformly coated with hydrocarbon wax, the average thickness of said wax coating ranging from about 0.5 to 15 microns, said wax being characterized by having:
      (1) a relatively sharp melting temperature in the range of from about 35 to 120° C., but at least about 20° C. below the melting temperature of said resin particles, and
      (2) a substantially completely crystalline structure below its melting point,
   (C) said wax having substantially uniformly distributed therethrough solid particulate material which is characterized by having:
      (1) an average particle size of under about 20 microns, and
      (2) a melting point less than the melting point of said resin particles.
2. The composition of claim 1 wherein said particulate solid material is a pigment.
3. The composition of claim 1 wherein said particulate solid material is a blowing agent.
4. The composition of claim 1 wherein said particulate solid material is a polyalkylene glycol.
5. The composition of claim 1 wherein said particulate solid material is an acrylonitrile/butadiene/styrene graft copolymer system.

References Cited

UNITED STATES PATENTS

| | | |
|---|---|---|
| 2,602,075 | 7/1952 | Carpenter et al. |
| 2,831,820 | 4/1958 | Aase et al. |
| 2,945,828 | 7/1960 | Henning. |
| 2,945,827 | 7/1960 | Henning. |
| 3,025,249 | 3/1962 | Chen. |
| 3,028,344 | 4/1962 | Johnson. |
| 3,051,665 | 8/1962 | Wismer et al. |
| 2,779,745 | 1/1957 | Howland. |
| 2,989,782 | 6/1961 | Barkhuff et al. |
| 3,089,824 | 5/1963 | Wurster. |
| 3,185,588 | 5/1965 | Resnick. |
| 2,945,634 | 7/1960 | Berk et al. 117—100X |
| 3,035,003 | 5/1962 | Kessler 117—100X |
| 3,057,751 | 10/1962 | Nagle 117—100 |
| 3,414,422 | 12/1968 | Iannicelli et al. 117—100X |
| 3,442,677 | 5/1969 | Balentine 117—100X |
| 3,196,827 | 7/1965 | Wurster et al. |
| 3,390,049 | 6/1968 | Rednick et al. |
| 2,995,458 | 8/1961 | Murray 117—100X |
| 3,236,702 | 2/1966 | Sapiego 117—100X |
| 3,484,262 | 12/1969 | Hahn 117—100X |

FOREIGN PATENTS

| | | |
|---|---|---|
| 1,025,280 | 4/1966 | Great Britain. |
| 200,753 | 1/1955 | Australia 117—100 |
| 1,041,014 | 9/1966 | Great Britain 117—100 |

WILLIAM D. MARTIN, Primary Examiner

M. R. P. PERRONE, JR., Assistant Examiner

U.S. Cl. X.R.

117—121, 138.8B, E, F, U, 168

PO-1050
(5/69)

UNITED STATES PATENT OFFICE
CERTIFICATE OF CORRECTION

Patent No. 3,591,409      Dated July 6, 1971

Inventor(s) Norman E. Aubrey, Robert E. Beaulieu & William J. Hall

It is certified that error appears in the above-identified patent and that said Letters Patent are hereby corrected as shown below:

Column 1 - line 22 - after "therein" insert ---is---.

Column 1 - line 53 - "smilar" should read ---similar---.

Column 8 - line 64 - under "Reflectance at 540 m$\mu^3$" in Specimen Row F, "27.0" should read ---27.5---.

Column 8 - line 66 - under "Reflectance at 540 m$\mu^3$" in Specimen Row J, "36.5" should read ---36.0---.

Column 11- Table Three - under "Particle Size Microns" the last six items should read ---$<20$---
---$<20$---
---$<20$---
---$< 5$---
---$<20$---
---$<20$---.

Signed and sealed this 4th day of January 1972.

(SEAL)
Attest:

EDWARD M. FLETCHER, JR.      ROBERT GOTTSCHALK
Attesting Officer      Acting Commissioner of Patents